United States Patent [19]

Cohen

[11] 4,065,825
[45] Jan. 3, 1978

[54] LOADING RAMP
[76] Inventor: Antony Cohen, 1 Bowden Lane, Southampton, Hampshire, England
[21] Appl. No.: 668,633
[22] Filed: Mar. 19, 1976
[30] Foreign Application Priority Data
  Mar. 25, 1975 United Kingdom .............. 12482/75
[51] Int. Cl.$^2$ ............................................ E01D 15/00
[52] U.S. Cl. ...................................... 14/72.5; 214/505
[58] Field of Search ............ 14/72 R, 72 W; 214/501, 214/505, 506

[56] References Cited

U.S. PATENT DOCUMENTS

| | | | |
|---|---|---|---|
| 428,551 | 5/1890 | Carter | 214/505 |
| 963,918 | 7/1910 | Miller | 14/72 |
| 2,364,365 | 12/1944 | Hultquist | 214/505 |
| 2,607,937 | 8/1952 | Stone | 14/72 |
| 2,644,180 | 7/1953 | Eycleshimer | 14/72 |
| 2,670,484 | 3/1954 | Bintliff | 14/72 W |
| 3,027,580 | 4/1962 | Haack | 14/72 |
| 3,035,728 | 5/1962 | Hecker | 214/505 |
| 3,370,726 | 2/1968 | Ijichi | 214/506 |
| 3,802,018 | 4/1974 | Miles | 14/72 W |

*Primary Examiner*—Nile C. Byers
*Attorney, Agent, or Firm*—Browdy and Neimark

[57] ABSTRACT

A loading ramp for loading vehicles onto the bed of a lorry comprising a framework of girders, decking on the girders and legs of variable length at one end of the framework, on which legs the framework can be supported at an inclination to the ground to allow vehicles to be driven or winched up or down the inclined decking. Preferably the loading ramp is mounted on wheels so that it can readily be towed, the wheels being provided on an undercarriage formed as a rigid sub-framework which is slidably movable to position the undercarriage adjacent the raised end of the framework.

23 Claims, 13 Drawing Figures

LOADING RAMP

The invention relates to a loading ramp whereby vehicles, such as earth moving vehicles, can be loaded on to the bed of a lorry.

Various means have been devised for loading vehicles on to lorries, for example a hydraulically movable lorry bed which can be moved to a position in which the lorry can be driven thereonto and then moved hydraulically to a transporting position, but such means are either too expensive or otherwise unsatisfactory.

"Low loader" lorries can be used for transporting tracked or wheeled vehicles but although loading of the vehicles on to the low loaders is much easier than on to the bed of a high lorry, low loader lorries are very much more expensive than ordinary high bed lorries.

Attempts have hitherto been made to devise loading ramps which are inclinable from a horizontal position to an inclination which enables the bed of a vehicle to be loaded therefrom. Thus German Patent Specifications Nos. 483,054 and 524,417 describe ramps having a displaceable undercarriage mounting a pair of wheels which rest on the ground at all times and are caused to rotate by means of a crank thereby displacing the undercarriage towards one end of the ramp and in so doing raising that end of the ramp away from the undercarriage and lowering the other end of the undercarriage towards the ground. Different mechanisms for achieving the actual raising and lowering of the ramp in accordance with the displacement of the undercarriage are disclosed in the two aforesaid specifications. The raised end of the ramp remains unsupported and while this may not be a problem when using the ramp for the loading of cattle, which is the intended purpose of the ramps of these specifications, it precludes the loading of substantially heavier loads of, say 5 tons and upwards, as will frequently be required.

In contrast thereto, German Patent No. 724,808 describes a ramp which can be trailed horizontally behind a vehicle and which comprises at one end supporting legs which are raised with respect to the ground during towing of the ramp and which are let down when the ramp is to be inclined. In this case, it is the legs which serve to provide the inclination of the ramp. However, despite the advantages of the provision of such legs, practical problems are encountered in that the legs are of fixed length so that the ramps can only be employed with lorry beds of matching height. Moreover, German Patent No. 724,808 fails to disclose a leg construction which, when in contact with the ground, is clearly capable of taking the weight of such vehicles as earth moving vehicles.

A further disadvantage of the aforesaid types of transportable ramp is that if the wheels thereof carry pneumatic tyres, relatively heavy dynamic loads on the ramp will cause the tyres to rupture.

U.S. Pat. No. 3,548,433 describes a dirigible mobile yarn ramp comprising a substantially horizontal top surface, first wheel means at a substantially central position in the lengthwise direction thereof, retractable second wheel means adjacent one end and adjusting means associated with the first wheel means operable perpendicularly with respect to the top surface of the ramp to effect vertical positioning of one end of the ramp. Adjustment of the ramp from a central position places a limit on the extent to which one end of the ramp can be raised. Moreover the raised end of the ramp remains unsupported and the entire dynamic loading of the ramp by a vehicle moving thereover must be taken up by the first wheel means. Finally, the ramp is neither capable of or intended for towing owing to its being too low for towing behind a vehicle when in its substantially horizontal position. The ramp thus possesses all the disadvantages of ramps of the type described hereinbefore and is clearly unsuitable for use in the loading of heavy vehicles on to the beds of lorries.

The transportable ramps disclosed in the aforesaid patent specifications are to be distinguished from transporting trailers which are inclinable for ease of loading. One such type of trailer is disclosed in U.S. Pat. No. 2,364,365. The trailer is adapted for coupling to a draft vehicle and comprises an elevating brace comprising a rectangular framework one end of which can be lowered to contact the ground and thereby raise the forward end of the trailer for the loading thereof. When in such a disposition, the opposite end of the brace extends above the plane of the deck of the trailer and renders the trailer unsuitable for use in the loading of the beds of lorries.

It is an object of the present invention to provide a self-standing loading ramp which can be utilized in the loading of heavy vehicles on to lorry beds of differing height.

According to the present invention, there is provided a loading ramp for loading vehicles on to a bed of a lorry comprising a framework of girders, decking on the girders and legs of variable length inclined with respect to the framework and rigidly joined to the framework at or adjacent one end thereof, on which legs the framework can be supported at an inclination to the ground, with the other end of the framework in contact with the ground, so that vehicles can be winched or driven up or down the inclined decking, said inclination being variable in accordance with the extent to which said legs are lengthened.

Preferably, the decking comprises two spaced apart longitudinally extending strips of decking, for example wood blocks or steel grating sold under the trade mark "Expamet", the two strips of decking being spaced apart by the wheel spacing or track spacing of vehicles likely to be moved up or down the ramp.

Advantageously, the loading ramp is mounted on wheels and includes coupling means whereby it can be trailed behind a motor driven vehicle.

The framework of girders may be rigidly fixed to a chassis which mounts the wheels and the coupling means.

Alternatively and preferably, where a ramp capable of loading very heavy vehicles is required, an undercarriage is provided comprising a rigid sub-framework mounting the wheels and engaged with and longitudinally movable with respect to the framework of girders.

Preferably the framework of girders is so fixed to the chassis, or the rigid sub-framework is so formed and so engaged with the framework, that when trailed behind a towing vehicle the decking is at an inclination to the ground but at a lesser inclination than the required for loading vehicles on to the bed of a lorry.

Preferably the coupling means comprise a towing girder or a towing framework pivotably mounted to the framework at a position or positions spaced rearwardly from the front end of the framework and detachably coupled to the framework adjacent the front end of the framework, such that, after uncoupling the detachable coupling, the towing girder or towing framework can be pivoted about its pivot mounting to the framework so that the front end of the towing girder or towing framework can be lowered to the ground.

An extension flap is advantageously provided at each end of each of the strips of decking, which flaps can bridge between the lower ends of the strips of decking and the ground and between the upper ends of the strips of decking and the bed of a lorry.

The legs of variable length advantageously each comprise two telescopic members, a first of the telescopic members being secured at its upper end to said one end of the framework and a second of the telescopic member being provided at its lower end with a foot to bear on the ground.

Aligned apertures may be provided in the telescopic members, whereby by insertion of a pin, the length of the leg can be set to a determined height. The aligned apertures in the first of the telescopic members may be provided as longitudinally extending slots therein, the first of the members is externally screw-threaded and a nut is provided on said screw-thread such that a pin passed through the slot and through one of the apertures in the second of the members bears against the underside of the nut such that rotation of the nut on the first of the members lengthens or shortens the leg.

Alternatively the legs may each include internal gearing incorporating a worm and be coupled by a cross shaft rotatable manually by means of a crank handle, preferably at one or other of two different speed ratios, whereby the second telescopic members can be moved together each with respect to its first telescopic member to lengthen or shorten the legs as desired.

The spacing apart of the two telescopic members of each leg over at least part of the length thereof is preferably so small that deflection of the first telescopic member with respect to the second telescopic member is less than 1.5°, more preferably less than 1°, when the legs are fully extended and the ramp is subject to a dynamic load. This reduction in deflection is desirable if risk of damage to the worm mechanism is to be avoided reliably when the ramp is subject to high dynamic loading. The reduction is deflection may be achieved if employing a conventional form of telescopic leg having a spacing apart of its component telescopic members of say 0.25 inches by externally plating with metal the inner of the telescopic members or internally plating with metal the outer of the telescopic members. Such plating need only be provided over a relatively narrow section of the length of the selected telescopic members. It has been found that such plating of one, or possibly even both, of the telescopic members in no way reduces the efficiency of operation of the telescopic legs. The regular operation of the legs with substantially zero clearance therebetween causes regeneration of coating surfaces owing to the cold rolling of the plating metal which is achieved.

Feet at the end of the legs are preferably pivotable with respect to the leg in order to take up changes in the inclination of the legs with respect to the ground as the ramp is raised or lowered. The foot can be turned into a position in which it is substantially inverted with respect to the position it occupies when resting on the ground. In this way improved clearance can be achieved when the ramp is being trailed. It is preferred that each second telescopic member be provided with a single foot comprising parallel plate members located on opposite sides of the second telescopic member and rigidly linked together at one end only, thereby permitting the simultaneous pivoting of the plate members with respect to the second telescopic member.

Where an undercarriage is provided and is longitudinally movable with respect to the framework, flanges are preferably provided on the rigid sub-framework to overlie flanges of longitudinally extending girders of the framework and a winch, preferably manually operable by a crank handle, is provided to effect sliding movement of the sub-framework with respect to the framework after the undercarriage has been relieved of the weight of the framework and the wheels raised from the ground by lengthening the legs to raise the front end of the framework and to cause the rear end of the framework to abut the ground. After the undercarriage and wheels have thus been moved from a travelling position intermediate the ends of the framework to a loading position adjacent the front end of the ramp, the front end of the ramp can be lowered to the required height for loading with out the wheels engaging the ground and thus without risking damage to the wheels by applying to them a part of the weight of the vehicle being loaded.

The flaps provided at the ends of the longitudinally extending strips of decking are preferably pivoted to the framework by means of pairs of links which allow the flaps to be swung between an inner transporting position and an outer operating position.

For a better understanding of the invention and to show how the same can be carried into effect, reference will now be made, by way of example only, to the accompanying drawing, wherein.

Referring to FIGS. 1 to 4 of the drawings, a first embodiment of a ramp for loading vehicles onto the bed of a lorry comprises a framework generally indicated at 1 and made up by transversely extending girders 2 and longitudinally extending girders 3. Upstanding angle iron members 4, tow of which are provided at each side of the framework 1, support decking strips 5 of "Expamet" steel grating.

Figure 1:
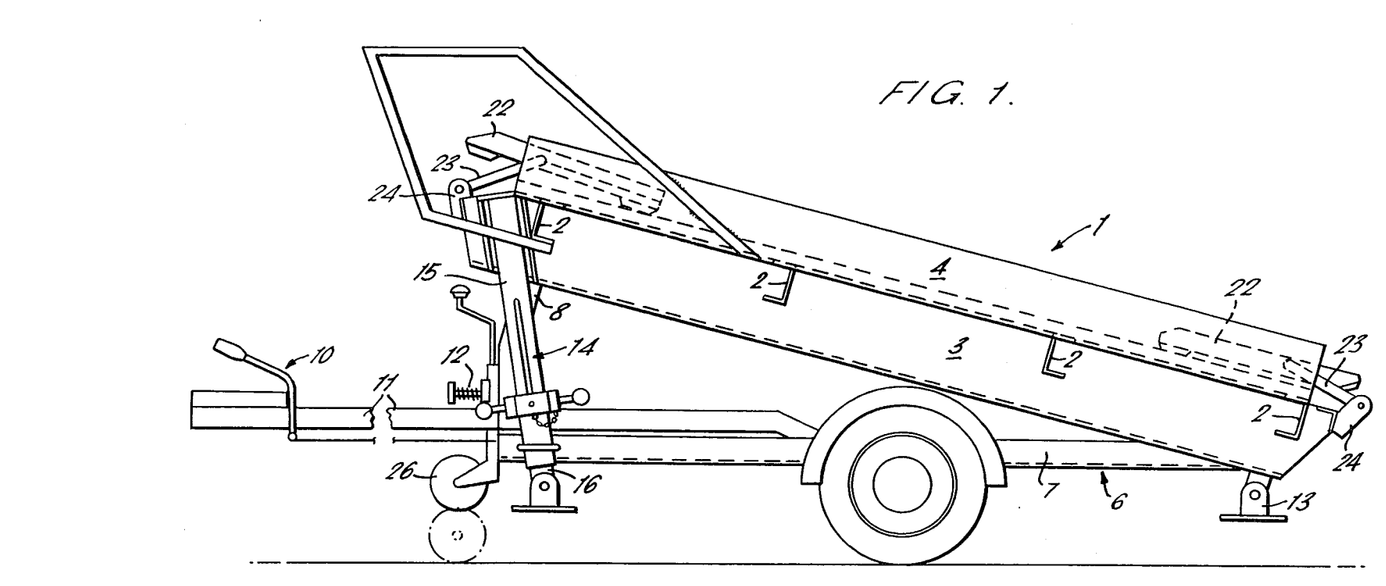
FIG. 1 is a side view of one embodiment of a ramp for loading vehicles, according to the invention, in a towing position.
Figure 2:
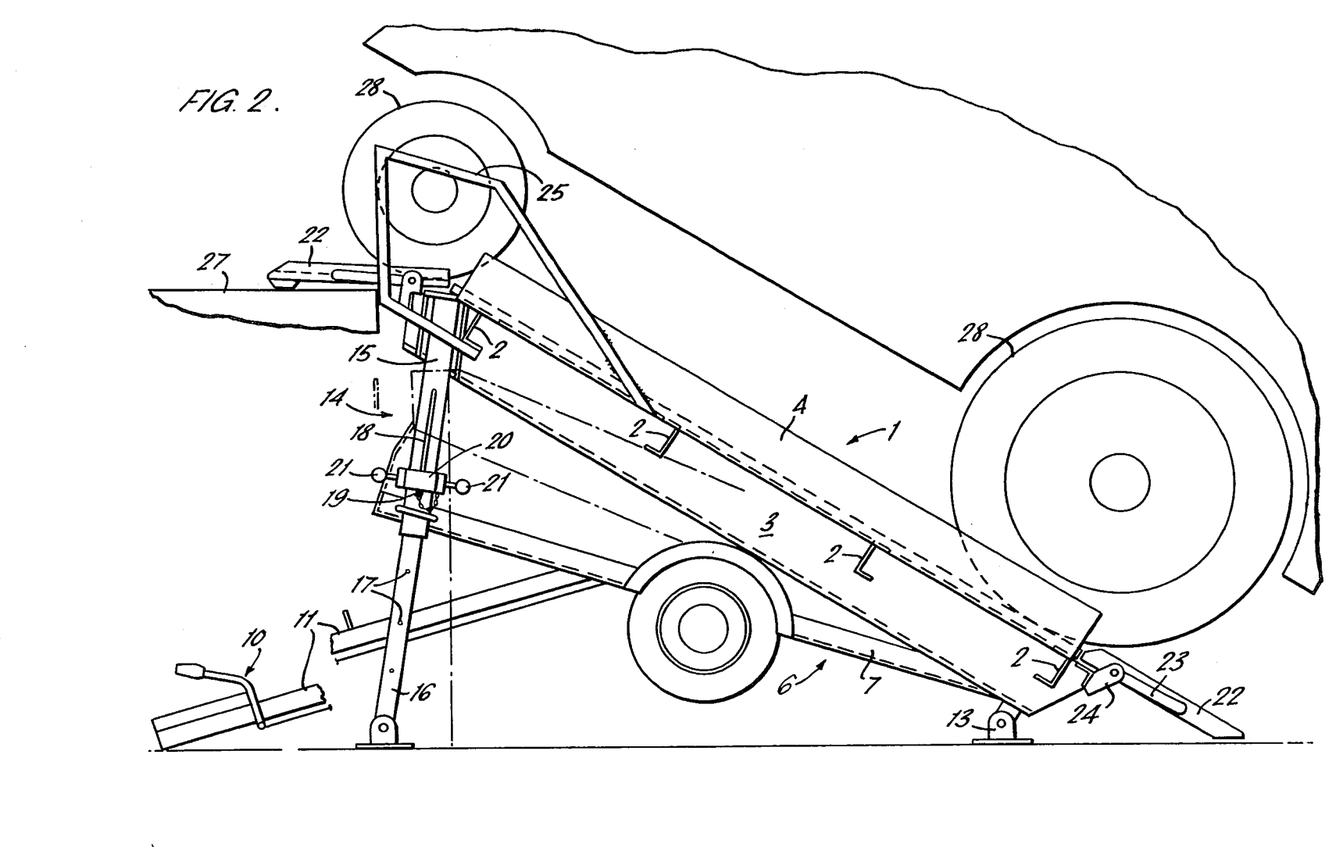
FIG. 2 is a similar view to FIG. 1 but showing the ramp of FIG. 1 in a loading position.
Figure 3:
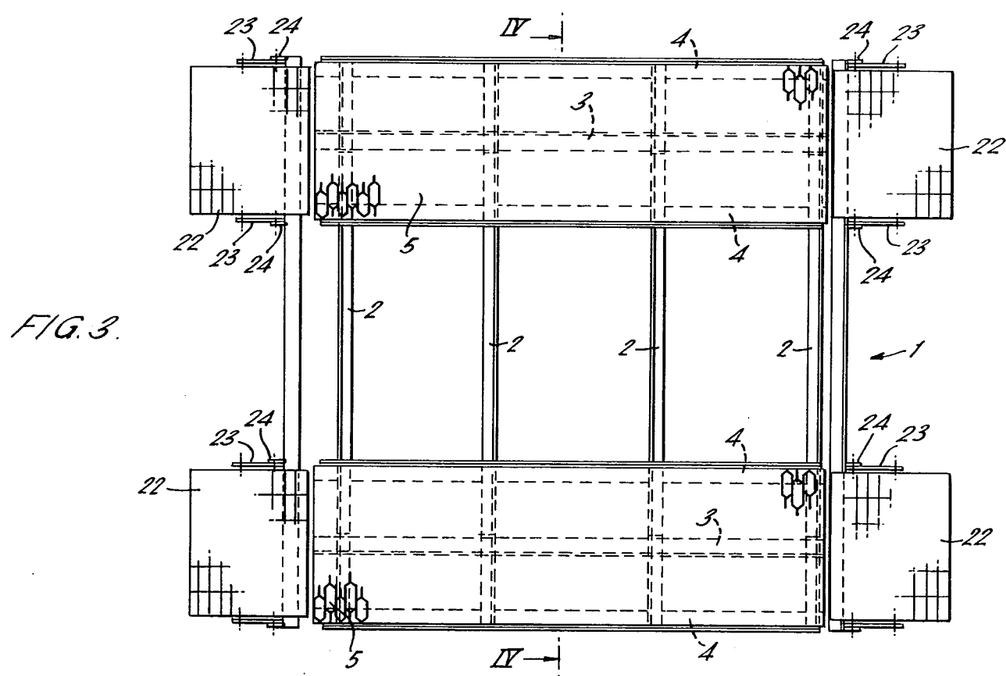
FIG. 3 is a plan view corresponding to FIGS. 1 and 2.
Figure 4:
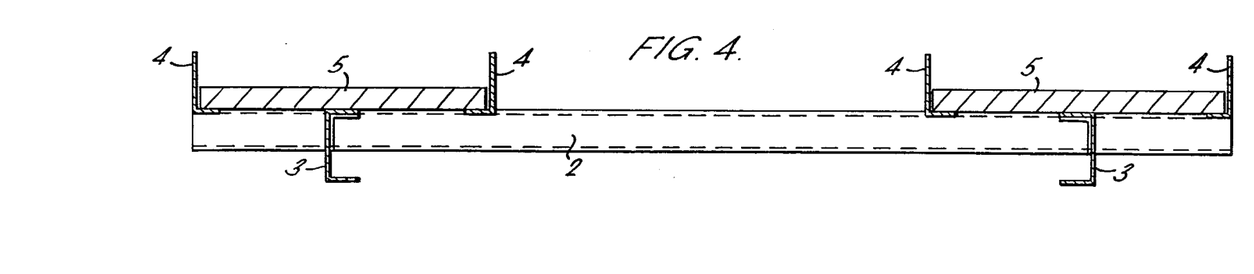
FIG. 4 is a sectional view taken on the line IV—IV of FIG. 3.

A rectangular chassis 6 having longitudinally extending side members 7 is secured at its rear end to the rear end of the framework 1 and at its front end is secured to the front end of the framework 1 by upstanding girders 8 such that the framework 1 is at an inclination to the chassis 6. The longitudinal side members 7 of the chassis 6 each support a wheel 9. A towing attachment 10 of known kind is provided at the front end of a girder 11 which at its rear end is pivoted on an axle connecting the wheels 9 and intermediate its ends is secured to a front transverse member of the rectangular chassis 6 by means of a removable spring-loaded pin 12.

A pivotable foot 13 is provided at each side of the rear end of the framework 1 and a leg 14 is provided at each side of the front end of the framework 1. Each leg 14 comprises an outer portion 15 which is secured by welding at its upper end to the framework 1 and an inner portion 16 telescopically received within the outer portion 15. The inner portion 16 has a plurality of apertures 17 therein, the outer portion 15 has elongated slots 18 therein and a pin 19 can be inserted through the slots 18 in the outer member 15 so as to pass through one of the apertures 17 in the inner member 16. The outer member 15 is screw-threaded on its outer surface and a nut 20 provided with handles 21 whereby it can be rotated, is engaged on the thread. The pin 19 bears against the underside of the nut 20. Thus, by rotating the nut, the pin 19 can be moved up and down the slots 10.

At each end of each of the decking strips 5 a flap 22 is provided. The flaps 22 are pivoted intermediate their ends to one end of link bars 23 and the other ends of the link bars 23 are pivoted to lugs 24 welded to the framework 1. The flaps 22 can be swung on the link bars 23 between transporting positions shown in FIG. 1 and operative positions shown in FIGS. 2 and 3. Preferably, the flaps 22 are each formed as a rectangular framework covered by "ambi-deck" gratings.

At each side of the forward upper end of the framework 1 a combined hand-rail abutment bar 25 is provided. A pivotable and adjustable jockey wheel 26 is provided at the front end of the chassis 6.

In operation, after detaching the ramp from a vehicle behind which it has been towed by the towing attachment 10, the ramp is wheeled up behind a lorry onto which a vehicle is to be loaded. The pin 12 is removed to allow the girder 11 to fall downwardly so that its front end is on the ground and the front end of the framework 1 is then raised by hand until the front end of the framework at the top of the legs 14 is on the same level as the bed of the lorry, indicated at 27 in FIG. 2. The pins 19 of the legs 14 are then removed to allow the inner part 16 of the legs to slide downwardly until the feet at the bottom ends thereof abut the ground. The pins 19 are then re-inserted and the nuts 20 rotated to provide a final height adjustment. In this position, the feet 13 at the rear end of the framework 1 will also abut the ground. The flaps 22 are swung outwardly on the link bars 23 to the positions shown in FIG. 2 and a vehicle, of up to say ten tons weight, can then be driven up the ramp with its wheels passing successively over the lower flaps 22, the decking strips 5 and the upper flaps 22, onto the bed 27 of the lorry. The wheels of a J C B being loaded are indicated in FIG. 2 at 28.

Referring to FIGS. 5 to 11 of the drawings, a second embodiment of a ramp for loading vehicles on to the bed of a lorry comprises a framework 30, an undercarriage 31 and a towing framework 32.

Figure 5:
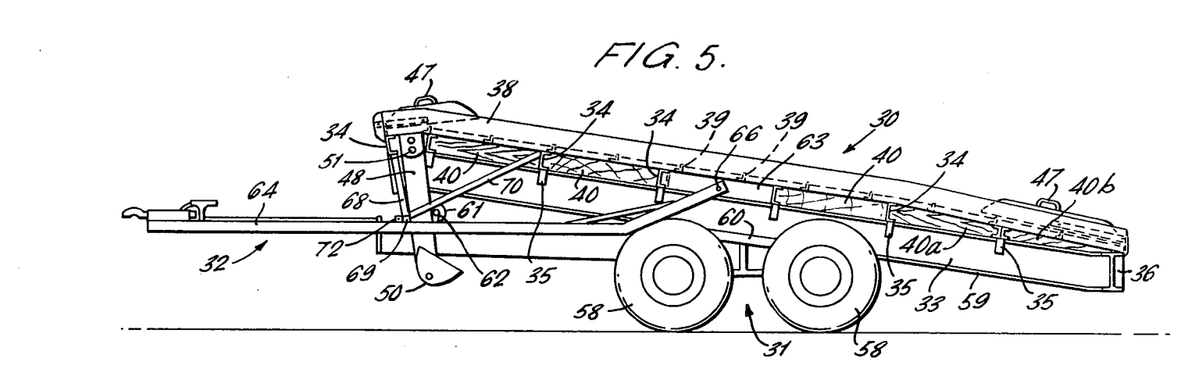
FIG. 5 is a side view of another embodiment of a ramp for loading vehicles, according to the invention, in a towing position.
Figure 10:
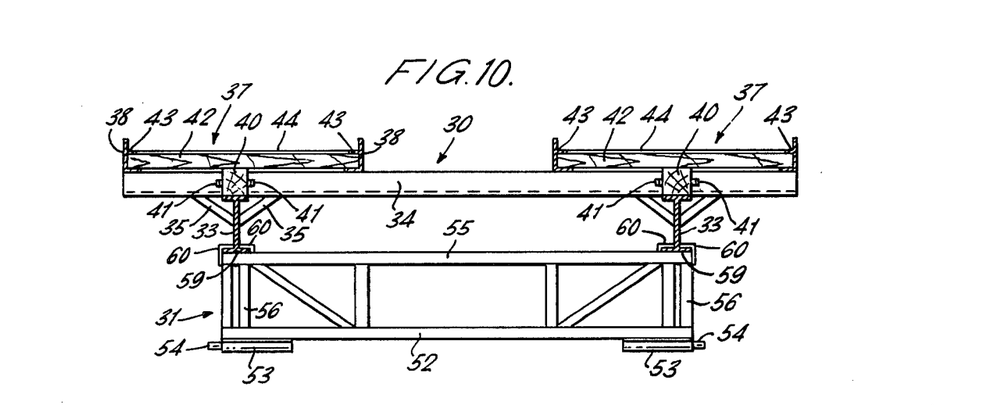
FIG. 10 shows the mounting of a framework of the ramp of FIGS. 5 to 7 on the undercarriage of FIGS. 8 and 9.

The framework 30 comprises two longitudinally extending I-section girders 33, a plurality of transversely extending channel-section girders 34 welded to the upper flanges of the girders 33 and braced thereon by inclined box-section struts 35, a transverse I-section girder 36 at the rear of the framework 30 and strips of decking generally indicating at 37. Each of the strips of decking 37 comprises two longitudinally extending inwardly facing angle-iron members 38 welded to the transverse girders 34 and a plurality of smaller section angle-iron members 39 extending between and welded to the angle-iron members 38. As best shown in FIGS. 5 and 10, blocks 40 of hard wood, preferably oak, are laid on the upper flanges of the longitudinally extending girders 33 and project above the upper faces of the transverse girders 34 by an amount equal to the thickness of the horizontal flanges of the longitudinal angle-irons 38. The blocks 40 are retained in position by brackets 41 welded to the transvere girders 34. At the rear end of the framework, as best seen in FIG. 5, the longitudinal angle-irons 38 are bent downwardly and the wooden blocks 40a, and 40b beneath the downwardly bent portions reduced in height towards their rear ends.

Decking slabs 42 (not shown in FIG. 8) of hard wood, preferably keruing rest on the horizontal flanges on the longitudinal angle-irons 38, the horizontal flanges of the transverse angle-irons 39 and the upper surfaces of the blocks 40. The decking slabs 42 are retained in position by longitudinally extending strips 43 welded to the vertical flanges of the longitudinal angle-irons 38 and the vertical flanges of the transverse angle-irons 39 extend a short distance above the upper surfaces of the decking slabs 42 to form projecting strips 44 (FIG. 10) of approximately ½ inch height to prevent wheels or tracks of vehicles being loaded by the ramp slipping for any great distance on the strips of decking 37.

At the ends of the strips of decking 37 flaps 45 are provided. The flaps 45 are of similar construction to the decking strips 37 and are pivotably mounted by means of links 46, pivoted to the vertical flanges of the angle-irons 38, whereby, by grasping handles 47 thereof, the flaps 45 can be swung between an inward position for travelling (shown in FIG. 5) and an outward operational position (shown in FIGS. 6 and 7).

At its front end the framework 30 mounts a pair of legs 48, one at each side of the framework. Each leg 48 has an outer upper portion rigidly secured to the framework 30 and an inner portion 49 telescopically engaged with the outer portion. The inner portion 49 has a pair of feet 50 at its lower end and is coupled to the outer portion by means of gearing including a worm in a manner such by attaching a manually operably crank handle to a shaft 51 extending through the upper ends of both of the legs 48, the inner portions 49 can be moved upwardly or downwardly with respect to the outer portions of the legs 48. Preferably the gearing is a two speed ratio gearing, ratio change being obtained by axially shifting the shaft 51 with respect to the legs 48. After pivoting the feet 50 from the cocked position (shown in FIG. 5) to the operation position (shown in FIG. 6) the shaft 51 can be rotated at the high speed ratio of the gearing to engage the feet 50 with the ground and then, preferably after shifting the low speed ratio of the gearing, the front end of the framework 30 can be raised upwardly from its travelling position. The legs 48 preferably have a collapse rating of 46 tons.

Figure 9:
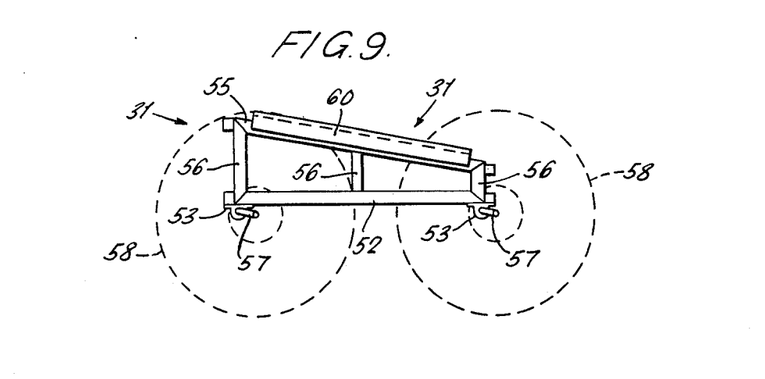

The undercarriage 31 comprises a framework of box-section steel members comprising a lower rectangular framework 52 mounting four suspension units 53 having stub axles 54 for mounting of wheels and an upper rectangular framework 55 secured to the lower rectangular framework 52 by vertical members 56, the vertical members 56 being so dimensioned that the upper rectangular framework 55 is at inclination to the lower rectangular framework 52. As shown in FIG. 9, trailing links 57 are secured against rotation on the stub axles 54 and mount wheels 58 by means of stub axles at their rear ends, the suspension units 53 being of the torque kind and incorporating springs resisting upward movement of the rear ends of the links 57.

Upper faces of side members of the upper rectangular framework 55 of the undercarriage 31 bear against the underside of lower flanges 59 of the longitudinal girders 33 and angle-iron members 60 have their vertical flanges welded to the side members of the upper rectangular frame 55 of the undercarriage 31 and their horizontal flanges extending above respective portions of the flanges 59 of the longitudinal girder 33, whereby the undercarriage 31 is mounted for longitudinal sliding movement with respect to the girders 33 and thus with respect to the framework 30. A 1000 lb. winch 61 is operable by rotating a transverse shaft 62 manually by means of a crank handle and has a cable connected to the undercarriage 31. Apertures are provided in the horizontal flanges of the angle-irons 60, which apertures are aligned with apertures in the flanges 59 of the girders 33 when the undercarriage 31 is in the position shown in FIG. 5 and are aligned with further apertures in the flanges 59 when the undercarriage 31 is in the position above in FIG. 6. Thus the undercarriage 31 can be locked against longitudinal movements with respect to the girders 33 either in the position of FIG. 5 or in the position of FIG. 6 by inserting locking pins into the aligned apertures.

Figure 6:
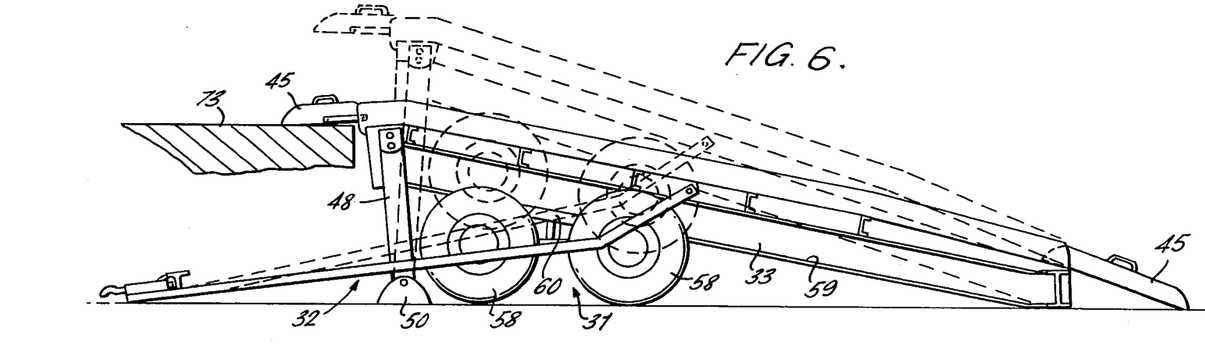
FIG. 6 is a similar view to FIG. 5, but showing the ramp of FIG. 5 in a loading position.
Figure 7:
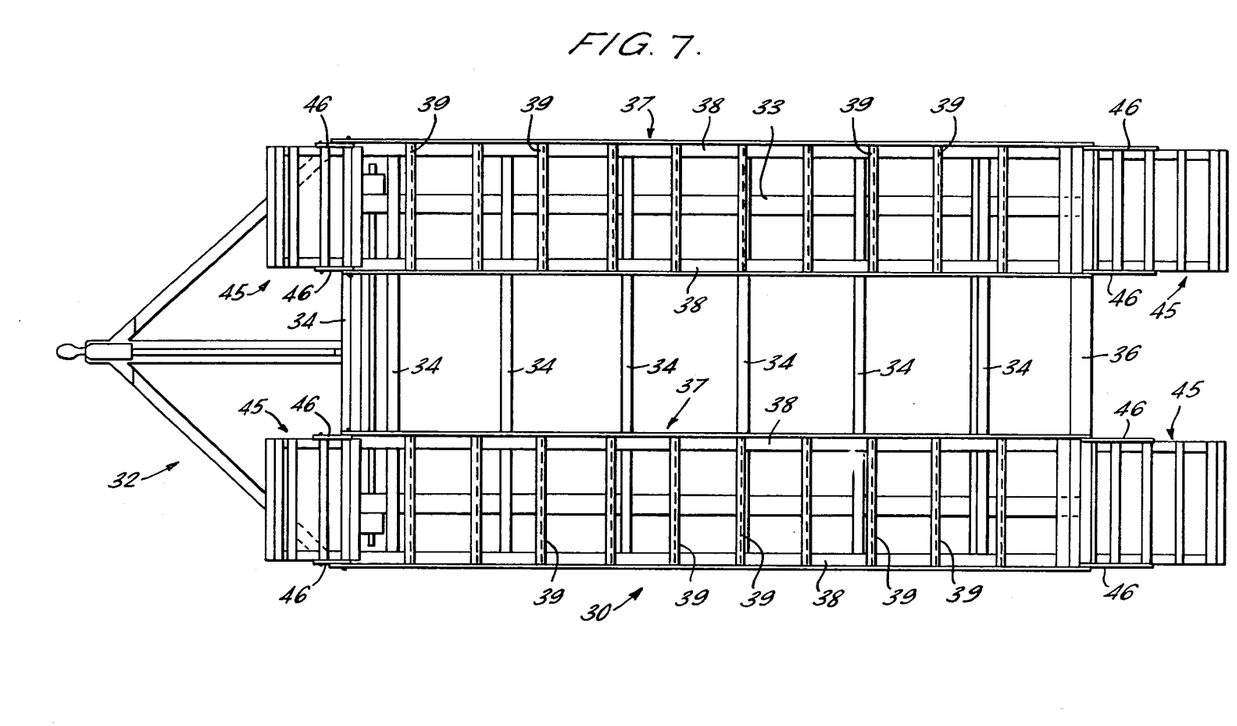
FIG. 7 is a plan view corresponding to FIGS. 5 and 6 but omitting an undercarriage of the ramp.
Figure 8:
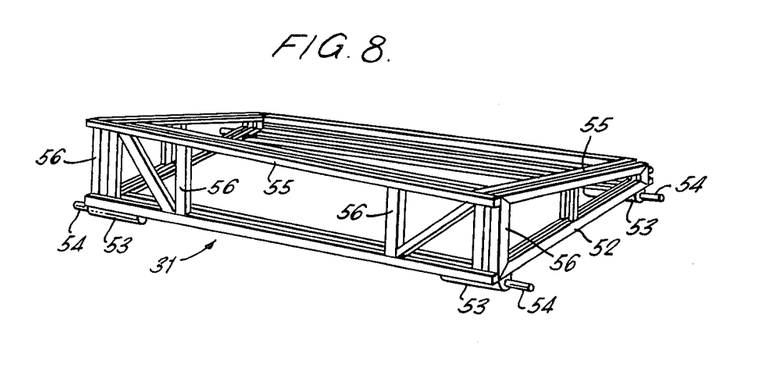
FIGS. 8 and 9 are respectively a perspective view and a side view of an undercarriage for the ramp of FIGS. 5 to 7.
Figure 11:
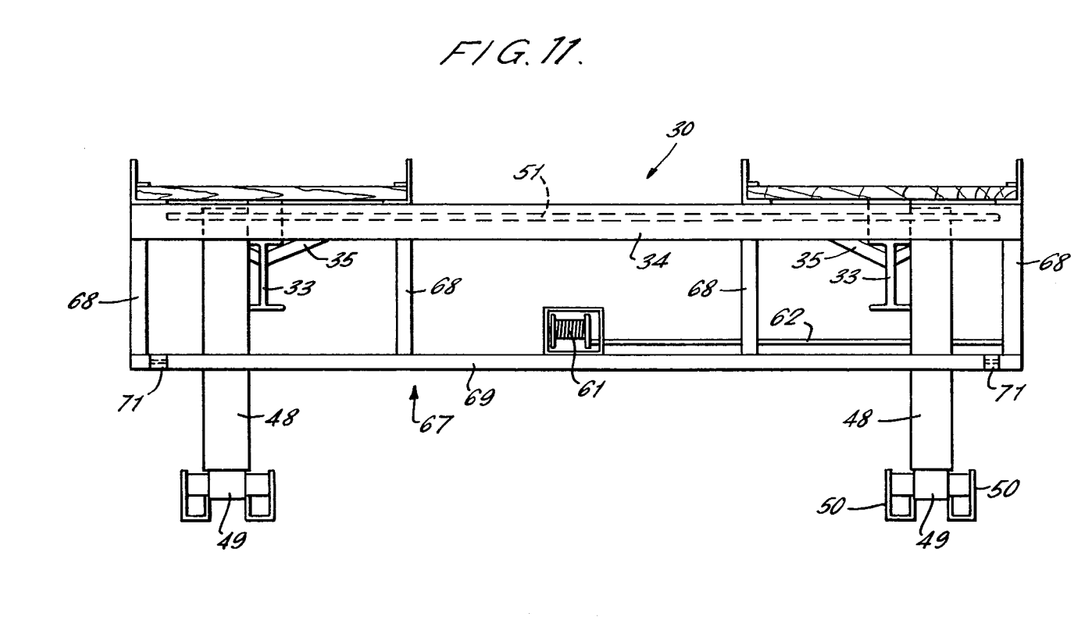
FIG. 11 shows a view of the front end of the ramp of FIGS. 5 to 7 but omitting the undercarriage and towing framework.

On either side of the framework 30 and in a position located above the position in which the undercarriage is located in the condition shown in FIG. 5, longitudinally extending channel members 63 are welded between the ends of a pair of the laterally extending girders 34. The towing framework 32 comprises a forward triangular shaped framework 64 with rearwardly extending arms 65, the rear ends of the arms 65 being pivoted at 66 to the channel members 63. A framework 67 of box-section steel members is welded to the front end of the framework 30 and, as best seen in FIGS. 5 and 11, comprises downwardly extending members 68, a transversely extending member 69 at the lower end of the members 68 and members 70 extending rearwardly from the transverse member 69 and secured at their rear ends of the ends of one of the lateral girders 34. Lugs 71 are provided on the forward face of the transverse member 69 and, with the towing framework 32 in the raised position shown in FIG. 5, horizontally extending apertures in the lug 71 are aligned with horizontally extending apertures in lugs 72 provided on the rearwardly extending arms 65 of the towing framework 32, whereby insertion of pins in the aligned apertures secures the towing framework 32 to pivot about the pivots 66 to allow the front end thereof to move downwardly to rest on the ground as shown in FIG. 6.

Figure 12:
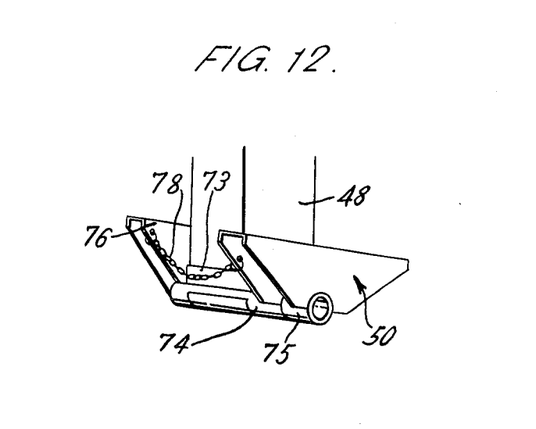
FIG. 12 is a perspective view of the base of a ramp leg carrying a preferred form of foot in a cocked position.
Figure 13:
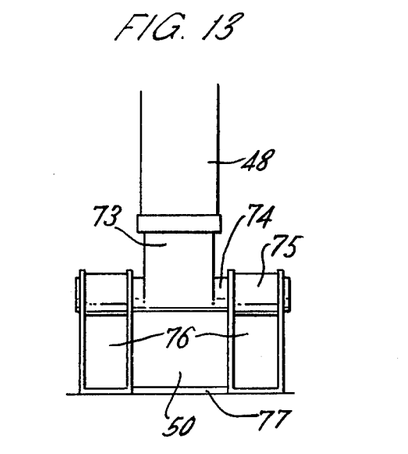
FIG. 13 is an elevational view of the base of the ramp leg showing the foot of FIG. 12 in the disposition it occupies when resting on the ground.

Referring finally to FIGS. 12 and 13, a foot 50 comprises a box section 73 fixedly secured to the base of the leg 48 and having a rod section 74 mounting at its free ends bushings 75 carried by a pair of foot sections 76 connected together by a plate 77 fixedly attached thereto so that the foot 50 consists of rigid members surrounding the leg 48 on three sides. The foot is thus capable of rotational movement from the cocked position shown in FIG. 13 and the leg can tilt with respect thereto when, in use, the ramp is raised thereon. The foot is held in the cocked position simply by means of a chain 78 spanning the free ends of the foot sections 76 and capable of release to allow the foot to fall readily into the in use position. The feet 50 can be employed with the ramp of FIGS. 1 to 4 as well as the ramp of FIGS. 5 to 11.

Although not visible in the drawings owing to restrictions imposed by the scale thereof, the clearance between the outer and upper portions of each leg and the inner portion 49 telescopically engaged therewith is only a fraction of a millimetre, thereby minimising the deflection of the upper leg portion with respect to the inner portion 49 when the leg is fully extended.

In operation of the ramp shown in FIGS. 5 to 11, the towing framework 32 is uncoupled from a towing vehicle and the ramp is wheeled up behind a lorry onto which a vehicle is to be loaded, the pins securing the towing framework 32 being removed to allow the front end of the towing framework 32 to be lowered to ground level so that it can extend beneath the lorry without fouling a safety framework on the rear of the lorry or a towing attachment on the lorry. When the front end of the framework 30 is positioned adjacent the rear edge of the deck of the lorry the feet 50 of the legs 48 are pivoted to their operational position and the shaft 51 of the legs 48 is rotated by a crank handle to lower the feet 50 into abutment with the ground. The shaft 51 is then shifted axially to change to low speed ratio and further rotated to extend the legs 48 and raise the front end of the framework 30 to maximum height, that is to say to the dotted line position shown in FIG. 6. As this is done the rear end of the framework 30 will be lowered until the transverse girder 36 at the rear end rests on the ground. Raising the front end of the framework to maximum height in this way will lift the wheels 58 from the ground and the locking pins can then be removed and the shaft 62 of the winch 61 rotated by a crank handle to slide the undercarriage 31 forwardly along the flanges 59 of the girders 33 to the dotted line position shown in FIG. 6. The shaft 51 of the legs 48 can then again be rotated to lower the front end of the framework 30 to a position in which it is level with the bed of a lorry indicated at 73 in FIG. 6. If they have not already been swung outwardly the flaps 45 can then be swung on the links 46 to cause the rear end flaps 45 to have their rear ends resting on the ground and their front ends resting on the rear ends of the strips of decking 37 of the framework 30 and the front end flaps 45 to have their front ends resting on the bed of the lorry 73 and their rear ends resting on the front ends of the strips of decking 37. A vehicle, either tracked or wheeled, can then be driven up the rear flaps 45, the strips of decking 37 and the front flaps 45 onto the bed 73 of the lorry or can be winched up the ramp by a winch provided on the lorry. The flaps 45 can then be moved to their inward position, the legs 48 extended to their maximum height, the winch 61 released to allow the undercarriage 31 to slide down the girders 33 to abut a bottom stop and be locked in position, the legs 48 retracted, the feet 50 swung to the travelling position and the towing framework 32 raised and locked in the raised position to permit the wheeled ramp to be towed away and used at another location.

A ramp according to the invention can have the advantages that:

1. it is adjustable according to the height of the lorry bed;
2. the weight of the vehicle on the ramp is not transferred to the lorry until the wheels pass onto the upper flaps and therefore the risk of the ramp slipping away from the lorry is avoided;
3. the towing attachment can be dropped down when the ramp is brought into position behind the lorry, thereby to pass under the safety bars sometimes provided at the rear end of lorries;
4. the ramp need not be attached to, i.e. hooked onto, the lorry for effective operation;
5. there is no weight on the wheels of the ramp when in use for loading or unloading;
6. plant can be safely moved onto the ramp and thus raised from the ground even without a lorry present, for example so that repairs can be effected to the plant without the danger of relying on hydraulic equipment to keep the vehicle raised above the ground;
7. the ramp formed as a trailer can be of sufficient strength to load, for example, up to twenty ton or more vehicles while itself being of a size and weight such that it can be towed behind an ordinary car; and
8. the capital cost of the trailer ramp can be very low compared, for example, with the cost of providing a lorry with an hydraulically movable lorry bed.

I claim:

1. A loading ramp for positioning adjacent the bed of a lorry for loading vehicles thereonto and comprising
a framework of girders,
decking on the girders, and
legs of variable length inclined at an angle of less than 90° with respect to the framework and rigidly joined to the framework at or adjacent one end thereof, which legs comprise two telescopic members, a first of the telescopic members being rigidly secured at its upper end to said one end of the framework and a second of the telescopic members being provided at its lower end with at least one foot to bear on the ground,
on which legs the framework can be supported at an inclination to the ground with the other end of the framework in contact with the ground, so that vehicles can be winched up or down said decking, and said inclination being variable in accordance with the extent to which said legs are lengthened, and
aligned apertures in the telescopic members, whereby, by insertion of a pin, the length of the leg can be set to a desired height,
said aligned apertures in the first of the telescopic members being provided as longitudinally extending slots therein, the first of the members being externally screw threaded and a nut being provided on said screw thread such that a pin passed through the slot and through one of the apertures in the second of the members bears against the underside of the nut and rotation of the nut on the first of the members lengthens or shortens the leg.

2. A loading ramp for positioning adjacent the bed of a lorry for loading vehicles thereonto and comprising
a framework of griders,
decking on the girders, and
legs of variable length inclined at an angle of less than 90° with respect to the framework and rigidly joined to the framework at or adjacent one end thereof, which legs comprise two telescopic members, a first of the telescopic members being rigidly secured at its upper end to said one end of the framework and a second of the telescopic members being provided at its lower end with at least one foot to bear on the ground,
on which legs the framework can be supported at an inclination to the ground with the other end of the framework in contact with the ground, so that vehicles can be winched up or down said decking, and said inclination being variable in accordance with the extent to which said legs are lengthened, and wherein said
legs include internal gearing incorporating a worm and coupled by a cross shaft rotatable manually by means of a crank handle whereby the second telescopic members can be moved together each with respect to its first telescopic member to lengthen or shorten the leg as desired.

3. A loading ramp according to claim 2, in which the spacing apart of the two said telescopic members of said legs over at least part of the lengths thereof is so small that deflection of the first telescopic member with respect to the second telescopic member is less than 1.5° when the legs are fully extended and the ramp is subject to a dynamic load.

4. A loading ramp for positioning adjacent the bed of a lorry for loading vehicles thereonto and comprising
a framework of girders,
decking on the girders, and
legs of variable length inclined at an angle of less than 90° with respect to the framework and rigidly joined to the framework at or adjacent one end thereof, which legs comprise two telescopic members, a first of the telescopic members being rigidly secured at its upper end to said one end of the framework and a second of the telescopic members being provided at its lower end with at least one foot to bear on the ground,
on which legs the framework can be supported at an inclination to the ground with the other end of the framework in contact with the ground, so that vehicles can be winched up or down said decking, and said inclination being variable in accordance with the extent to which said legs are lengthened, and
wherein each said foot is pivotally mounted with respect to the second telescopic member associated therewith and securing means are provided for holding the said foot in a position in which it is pivoted away from the position it occupies when it bears on the ground.

5. A loading ramp according to claim 4, wherein each second telescopic member is provided with a single foot comprising parallel plate members located on oposite sides of the second telescopic member and rigidly and permanently linked together at one end only thereof, thereby permitting the simultaneous pivoting of said plate members with respect to the second telescopic member.

6. A loading ramp for positioning adjacent the bed of a lorry for loading vehicles thereonto and comprising
a framework of girders, decking on the girders, legs of variable length inclined at an angle of less than 90° with respect to the framework and rigidly joined to the framework at or adjacent one end thereof, which legs comprise two telescopic members, a first of the telescopic members being rigidly secured at its upper end to said one end of the framework and a second of the telescopic members being provided at its lower end with at least one foot to bear on the ground, on which legs the framework can be supported at an inclination to the ground with the other end of the framework in contact with the ground, so that vehicles can be winched up or down said decking, and said inclination being variable in accordance with the extent to which said legs are lengthened, wheels on which the ramp is mounted, and coupling means, whereby the ramp can be trailed behind a motor driven vehicle.

7. A loading ramp according to claim 6, in which the framework of girders is rigidly fixed to a chassis which mounts the wheels and the coupling means.

8. A loading ramp according to claim 6, including a rigid sub-framework mounting the wheels and engaged with and longitudinally moveable with respect to the framework of girders.

9. A loading ramp according to claim 8, in which the rigid sub-framework includes flanges to overlie flanges of longitudinally extending girders of the framework and mount the rigid sub-framework for sliding movement with respect to the framework and the ramp includes a winch effective to cause sliding movement of the undercarriage with respect to the framework after the legs of variable length have been extended to raise said one end of the framework sufficiently to relieve the undercarriage of weight of the framework and to raise the wheels thereof from the ground, whereby the undercarriage can be moved with respect to the framework towards said one end of the framework such that said one end of the ramp can be lowered to a height corresponding to the lowest height of lorry bed likely to be encountered without the wheels re-engaging the ground.

10. A loading ramp according to claim 7, in which the rigid sub-framework is so formed and so engaged with the framework that when trailed behind a towing vehicle the decking is at an inclination to the ground but at a lesser inclination than that required for loading vehicles on to the bed of a lorry.

11. A loading ramp according to claim 8, in which the rigid sub-framework includes flanges to overlie flanges of longitudinally extending girders of the framework and mount the rigid sub-framework for sliding movement with respect to the framework and the ramp includes a winch effective to cause sliding movement of the undercarriage with respect to the framework after the legs of variable length have been extended to raise said one end fo the framework sufficiently to relieve the undercarriage of weight of the framework and to raise the wheels thereof from the ground, whereby the undercarriage can be moved with respect to the framework towards said one end of the framework such that said one end of the ramp can be lowered to a height corresponding to the lowest height of lorry bed likely to be encountered without the wheels re-engaging the ground, and in which the rigid sub-framework is so formed and so engaged with the framework that when trailed behind a towing vehicle the decking is at an inclination to the ground but at a lesser inclination than that required for loading vehicles on to the bed of a lorry.

12. A loading ramp according to claim 7, in which the legs of variable length each comprise two telescopic members, a first of the telescopic members being rigidly secured at its upper end to said one end of the framework and a second of the telescopic members being provided at its lower end with at least one foot to bear on the ground.

13. A loading ramp according to claim 8, in which the legs of variable length each comprise two telescopic members, a first of the telescopic members being rigidly secured at its upper end to said one end of the framework and a second of the telescopic members being provided at its lower end with at least one foot to bear on the ground.

14. A loading ramp according to claim 7, wherein the legs of variable length each comprise two telescopic members, a first of the telescopic members being rigidly secured at its upper end to said one end of the framework and a second of the telescopic members being provided at its lower end with at least one foot to bear on the ground and including aligned apertures in the telescopic members, whereby, by inserting of a pin, the length of the leg can be set to a desired height, and, in which the aligned apertures in the first of the telescopic members are provided as longitudinally extending slots therein, the first of the members is externally screw threaded and a nut is provided on said screw thread such that a pin passed through the slot and through one of the apertures in the second of the members bears against the underside of the nut and rotation of the nut on the first of the members lengthens or shortens the leg.

15. A loading ramp for positioning adjacent the bed of a lorry for loading vehicles thereonto and comprising
a framework of girders,
decking on the girders,
legs of variable length inclined at an angle of less than 90° with respect to the framework and rigidly joined to the framework at or adjacent one end thereof, which legs comprise two telescopic members, a first of the telescopic members being rigidly secured at its upper end to said one end of the framework and a second of the telescopic members being provided at its lower end with at least one foot to bear on the ground,
on which legs the framework can be supported at an inclination to the ground with the other end of the framework in contact with the ground, so that vehicles can be winched up or down said decking, and said inclination being variable in accordance with the extent to which said legs are lengthened,
the legs including internal gearing incorporating a worm and coupled by a cross shaft rotatable manually by means of a crank handle whereby the second telescopic members can be moved together each with respect to its first telescopic member to lengthen or shorten the leg as desired,
wheels on which the ramp is mounted, and
coupling means whereby the ramp can be trailed behind a motor driven vehicle.

16. A loading ramp according to claim 15, wherein the spacing apart of the two said telescopic members of said legs over at least part of the lengths thereof is so small that deflection of the first telescopic member with respect to the second telescopic member is less than 1.5° when the legs are fully extended and the ramp is subject to a dynamic load.

17. A loading ramp according to claim 16, wherein said spacing is achieved by external plating with metal the inner of said telescopic members or internal plating of the outer of the telescopic members.

18. A loading ramp according to claim 16, including a rigid sub-framework mounting the wheels and engaged with and longitudinally moveable with respect to the framework of girders.

19. A loading ramp according to claim 16, including a rigid sub-framework mounting the wheels and engaged with and longitudinally moveable with respect to the framework of girders, and in which the rigid sub-framework includes flanges to overlie flanges of longitudinally extending girders of the framework and mount the rigid sub-framework for sliding movement with respect to the framework and the ramp includes a winch effective to cause sliding movement of the undercarriage with respect to the framework after the legs of variable length have been extended to raise said one end of the framework sufficiently to relieve the undercarriage of weight of the framework and to raise the wheels thereof from the ground, whereby the undercarriage can be moved with respect to the framework towards said one end of the framework such that said one end of the ramp can be lowered to a height corresponding to the lowest height of lorry bed likely to be encountered without the wheels re-engaging the ground.

20. A loading ramp for positioning adjacent the bed of a lorry for loading vehicles thereonto and comprising
a framework of girders,
decking on the girders,
legs of variable length inclined at an angle of less than 90° with respect to the framework and rigidly joined to the framework at or adjacent one end thereof, which legs comprise two telescopic members, a first of the telescopicc members being rigidly secured at its upper end to said one end of the framework and a second of the telescopic members being provided at its lower end with at least one foot to bear on the ground,
on which legs the framework can be supported at an inclination to the ground with the other end of the framework in contact with the ground, so that vehicles can be winched up or down said decking, and said inclination being variable in accordance with the extent to which said legs are lengthened,
the legs including internal gearing incorporating a worm and coupled by a cross shaft rotatable manually by means of a crank handle whereby the said telescopic members can be moved together each with respect to its first telescopic member to lengthen or shorten the leg as desired,
wheels on which the ramp is mounted,
coupling means whereby the ramp can be trailed behind a motor driven vehicle, and
a rigid sub-framework mounting the wheels and engaged with and longitudinally moveable with respect to the framework of girders, which rigid sub-framework is so formed and so engaged with the framework that when trailed behind a towing vehicle the decking is at an inclination to the ground but at a lesser inclination than that required for loading vehicles on to the bed of a lorry.

21. A loading ramp according to claim 20, wherein the rigid sub-framework includes flanges to overlie flanges of longitudinally extending girders of the framework and mount the rigid sub-framework for sliding movement with respect to the framework and the ramp includes a winch effective to cause sliding movement of the undercarriage with respect to the framework after the legs of variable length have been extended to raise said one end of the framework sufficiently to relieve the undercarriage of weight of the framework and to raise the wheels thereof from the ground whereby the undercarriage can be moved with respect to the framework towards said one end of the framework such that said one end of the ramp can be lowered to a height corresponding to the lowest height of lorry bed likely to be encountered without the wheels re-engaging the ground.

22. A loading ramp according to claim 21, wherein the spacing apart of the two said telescopic members of said legs over at least part of the lengths thereof is so small that deflection of the first telescopic member with respect to the second telescopic member is less than 1.5° when the legs are fully extended and the ramp is subject to a dynamic load.

23. A loading ramp according to claim 20, wherein the decking comprises two spaced apart longitudinally extending strips of decking, the two strips of decking being spaced apart by the wheel spacing or track spacing of vehicles likely to be moved up or down the ramp, the ramp further including an extension flap at each end of each of the strips of decking, which flaps can bridge between the lower ends of the strips of decking and the ground and between the upper ends of the strips of decking and the bed of the lorry and are pivoted to the framework by means of pairs of links which allow the flaps to be swung between an inner transporting position and an outer operating position.

* * * * *